United States Patent
Jiang et al.

(10) Patent No.: US 10,345,823 B2
(45) Date of Patent: Jul. 9, 2019

(54) METHOD AND APPARATUS FOR DETERMINING VEHICLE LOCATION IN VEHICLE-TO-VEHICLE COMMUNICATIONS

(71) Applicant: QUALCOMM INCORPORATED, San Diego, CA (US)

(72) Inventors: Libin Jiang, Bridgewater, NJ (US); Shailesh Patil, Raritan, NJ (US); Jubin Jose, Belle Mead, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/671,263

(22) Filed: Aug. 8, 2017

(65) Prior Publication Data

US 2018/0217613 A1 Aug. 2, 2018

Related U.S. Application Data

(60) Provisional application No. 62/452,397, filed on Jan. 31, 2017.

(51) Int. Cl.
| | |
|---|---|
| *G01S 19/51* | (2010.01) |
| *G05D 1/02* | (2006.01) |
| *G01S 19/42* | (2010.01) |
| *G08G 1/16* | (2006.01) |
| *G01S 19/41* | (2010.01) |

(Continued)

(52) U.S. Cl.
CPC .......... *G05D 1/0278* (2013.01); *G01S 5/0072* (2013.01); *G01S 5/0284* (2013.01); *G01S 19/14* (2013.01); *G01S 19/41* (2013.01); *G01S 19/42* (2013.01); *G01S 19/51* (2013.01);

(Continued)

(58) Field of Classification Search
CPC . G01S 19/33; G01S 19/39; G01S 1/68; G01S 5/0284; G01S 19/42; G01S 19/51; G05D 1/0278
USPC ...... 342/357.22, 357.4, 357.34, 357.39, 386; 701/468, 517
See application file for complete search history.

(56) References Cited

U.S. PATENT DOCUMENTS

| | | | |
|---|---|---|---|
| 8,255,144 B2 | 8/2012 | Breed et al. | |
| 9,031,089 B2 | 5/2015 | Rubin et al. | |

(Continued)

FOREIGN PATENT DOCUMENTS

| | | |
|---|---|---|
| EP | 2546674 A1 | 1/2013 |
| WO | 2016159874 A1 | 10/2016 |

OTHER PUBLICATIONS

International Search Report and Written Opinion—PCT/US2018/012860—ISA/EPO—dated Apr. 18, 2018.

*Primary Examiner* — Dao L Phan
(74) *Attorney, Agent, or Firm* — Linda G. Gunderson; Smith Tempel Blaha LLC

(57) ABSTRACT

A method for developing and reporting enhanced user equipment (UE) location information includes obtaining a global positioning system (GPS) location for a user equipment (UE), determining a location of at least one radio frequency (RF) antenna relative to the GPS location, developing a reference frame based at least in part on the location of the at least one RF antenna, determining a location of a structural element of the UE, and transmitting the GPS location, the location of the at least one RF antenna, and the location of the structural element of the UE.

28 Claims, 14 Drawing Sheets

(51) Int. Cl.
  *G01S 19/14*   (2010.01)
  *G01S 5/00*    (2006.01)
  *G01S 5/02*    (2010.01)
  *G01S 19/53*       (2010.01)

(52) U.S. Cl.
  CPC .............. *G08G 1/163* (2013.01); *G01S 19/53* (2013.01); *G05D 2201/0213* (2013.01)

(56) References Cited

U.S. PATENT DOCUMENTS

| | | |
|---|---|---|
| 9,224,249 B2 | 12/2015 | Lowrey et al. |
| 2006/0022871 A1* | 2/2006 | Zimmerman ........... G01S 19/11 342/464 |
| 2007/0152804 A1 | 7/2007 | Breed et al. |
| 2009/0284426 A1* | 11/2009 | Snow .................... G01R 29/10 343/703 |
| 2009/0302850 A1* | 12/2009 | Lopez .................... G01V 3/15 324/337 |
| 2015/0208374 A1* | 7/2015 | Hill ....................... H04W 64/00 455/456.5 |
| 2016/0260328 A1 | 9/2016 | Mishra et al. |
| 2017/0025013 A1 | 1/2017 | Lee |

* cited by examiner

METHOD AND APPARATUS FOR DETERMINING VEHICLE LOCATION IN VEHICLE-TO-VEHICLE COMMUNICATIONS

RELATED APPLICATIONS

This application claims the benefit of U.S. Provisional Patent Application No. 62/452,397, entitled "Generating And Reporting Geometric Information In Vehicle-To-Vehicle Communications," filed Jan. 31, 2017, the contents of which are hereby incorporated by reference in their entirety.

TECHNICAL FIELD

The technology discussed below relates to wireless communication systems, and more particularly, to accurate vehicle location determination in vehicle-to-vehicle communications. Embodiments enable and provide accurate determination of vehicle location and vehicle boundaries for communication, including scenarios where this information can be shared dynamically with other vehicles.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). An example of an advancement of LTE technology is referred to as 5G. The term 5G represents an advancement of LTE technology including, for example, various advancements to the wireless interface, processing improvements, and the enablement of higher bandwidth to provide additional features and connectivity.

Wireless communications devices, sometimes referred to as user equipment (UE), may communicate with a base station or may communicate directly with another UE. When a UE communicates directly with another UE, the communication is referred to as device-to-device (D2D) communication. In particular use cases, a UE may be a wireless communication device, such as a portable cellular device, or may be a vehicle, such as an automobile, a drone, or may be any other connected device. When the UE is a vehicle, such as an automobile, the D2D communication may be referred to as vehicle-to-vehicle (V2V) communication. Other vehicle-based UE communications may include vehicle-to-everything (V2X), which may include V2V, vehicle-to-infrastructure (V2I), vehicle-to-network (V2N), and vehicle-to-pedestrian (V2P). Vehicle-to-everything (V2X) communications and particularly, V2V communications will become more and more important in the future for collision avoidance and autonomous driving.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for developing and reporting enhanced user equipment (UE) location information. Method embodiments can include obtaining a global positioning system (GPS) location for a user equipment (UE), determining a location of at least one radio frequency (RF) antenna relative to the GPS location, developing a reference frame based at least in part on the location of the at least one RF antenna, determining a location of a structural element of the UE, and transmitting GPS location, the location of the at least one RF antenna and the location of the structural element of the UE.

Another aspect of the disclosure provides an apparatus for developing and reporting enhanced user equipment (UE) location information including a global positioning system (GPS) configured to generate a GPS location for a user equipment (UE), at least one radio frequency (RF) antenna located relative to the GPS location, a reference frame based at least in part on the location of the at least one RF antenna and a location of a structural element of the UE, and a transmitter configured to transmit the GPS location, the location of the at least one RF antenna and the location of the structural element of the UE.

Another aspect of the disclosure provides a device including means for obtaining a global positioning system (GPS) location for a user equipment (UE), means for determining a location of at least one radio frequency (RF) antenna relative to the GPS location, means for developing a reference frame based at least in part on the location of the at least one RF antenna, means for determining a location of a structural element of the UE, and means for transmitting the GPS location, the location of the at least one RF antenna and the location of the structural element of the UE.

Another aspect of the disclosure provides a non-transitory computer-readable medium storing computer executable code for developing and reporting enhanced user equipment (UE) location information, the code executable by a processor to obtain a global positioning system (GPS) location for a user equipment (UE), determine a location of at least one radio frequency (RF) antenna relative to the GPS location, develop a reference frame based at least in part on the location of the at least one RF antenna, determine a location of a structural element of the UE, and transmit the GPS location, the location of the at least one RF antenna and the location of the structural element of the UE.

Another aspect of the disclosure provides a method for developing and reporting enhanced user equipment (UE) location information. Method embodiments can include obtaining a global positioning system (GPS) location for a user equipment (UE), determining a location of at least one radio frequency (RF) antenna relative to the GPS location, developing a reference frame based at least in part on the location of the at least one RF antenna, determining a location of a structural element of the UE, and transmitting the GPS location, the location of the at least one RF antenna, and the location of the structural element of the UE, such that a location of the UE is transmitted with centimeter-level accuracy.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
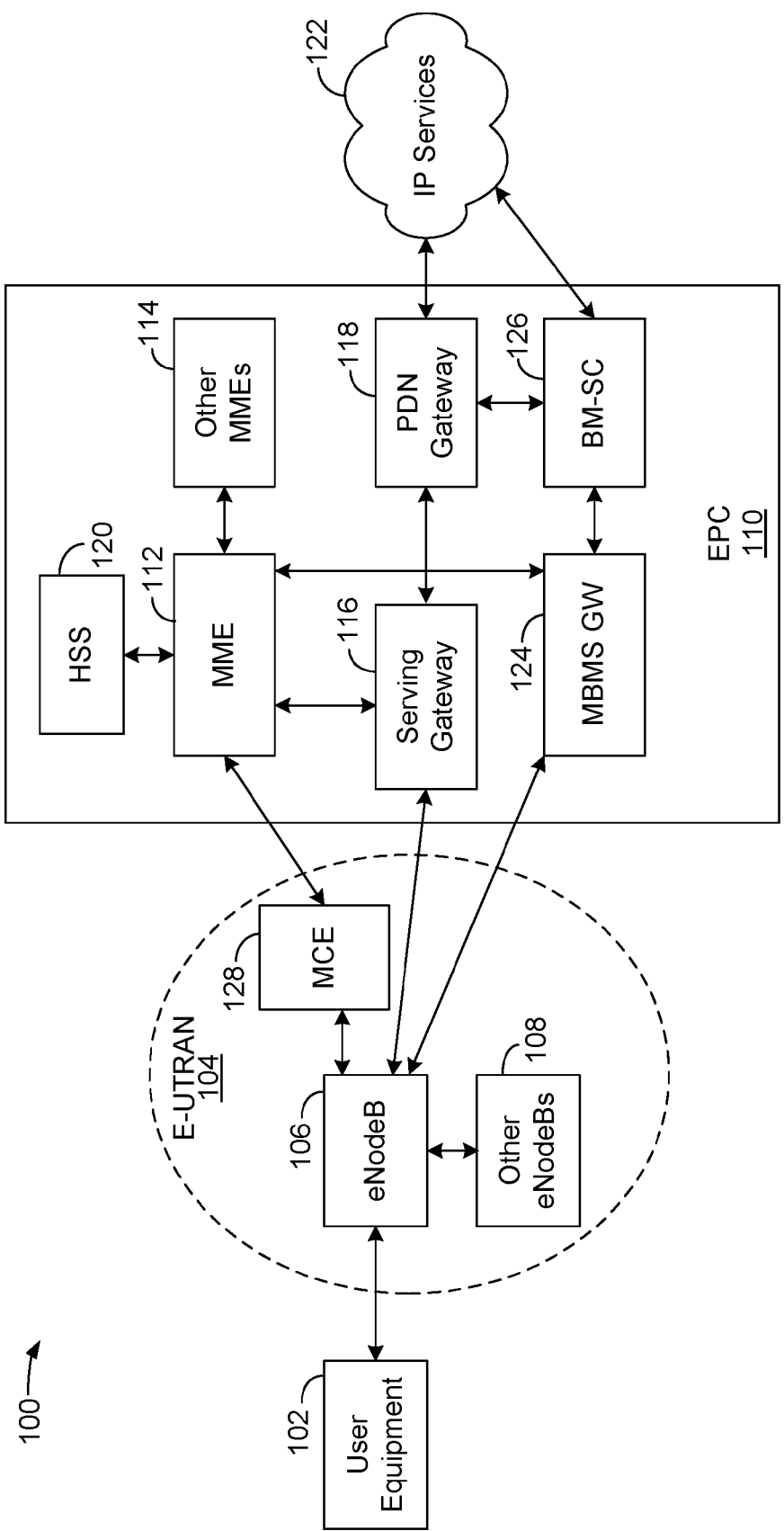
FIG. 1 is a diagram illustrating an example of a network architecture, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Exemplary embodiments of the disclosure are directed to device-to-device (D2D) and, more particularly, vehicle-to-vehicle (V2V) communication in which a vehicle may generate and report geometric information relating to a subject vehicle and to other vehicles in proximity to the subject vehicle. As used herein, the term "geometric information" relates to the location of one or more radio frequency (RF) antennas on a user equipment (UE), such as on a vehicle, the relationship of the RF antenna or antennas to a GPS antenna or antennas also located on the UE or vehicle, and the locations of one or more parts, elements, structural elements, or features of the structure of a UE, such as, for example, the locations of the edges, corners, or other parts or features of the UE or vehicle. As an example only, generating and reporting geometric information relating to a subject vehicle may include generating and reporting information relating to the relative locations on the vehicle of the RF antennas with respect to a GPS antenna located on the vehicle or the location of one or more structural elements or parts of the vehicle. Having information relating to the relative locations on the vehicle of the RF antennas with respect to a GPS antenna located on the vehicle may allow the UE, or the vehicle, to develop enhanced vehicle location information, such as a reference frame, sometimes referred to as a wireframe, which may refer to the volume, or boundaries of the vehicle, this information generated by knowing the locations of the RF antenna or antennas on the vehicle with respect to the location of the GPS antenna on the vehicle. The UE or the vehicle may also define the locations of one or more parts, or elements, or features of the vehicle structure, including, for example, the locations of the vehicle edges (e.g., the sides, top, front and the rear), the locations of the vehicle corners, or the locations of other parts or elements associated with the structure of the vehicle, as part of the enhanced vehicle location information. Such information is particularly useful for collision avoidance and autonomous driving. Having this enhanced vehicle location information may improve the ability to determine vehicle location, position, and boundaries in V2X and particularly, in V2V communications. This enhanced vehicle location information may be independently transmitted, or may be incorporated into a communication system basic safety message (BSM), or other communication message, and may improve the performance of a self-driving vehicle, particularly in the area of collision avoidance.

The basic safety message (BSM) transmitted by a vehicle, as currently defined in LTE-V2V, contains information of the vehicle's position, speed, heading, etc. However, this information may not be sufficient for future applications that will demand position accuracy on the order of centimeters. For example, the reported GPS position of the vehicle is in fact the position of the GPS antenna on the vehicle. Therefore, the GPS position does not provide information about the positions of the vehicle edges (e.g., the sides, top, front and the rear), the locations of which are important to know for collision avoidance and autonomous driving.

In an exemplary embodiment, the one or more RF antennas may be used for V2X, V2V, or other vehicle to anything ranging with other vehicles, objects, etc., using, for example only, the 5.9 GHz spectrum for intelligent transport systems (ITS). A vehicle may broadcast its GPS position or location to other vehicles or objects. In an exemplary embodiment, it may be desirable to combine the GPS position or location of the vehicle with the ranging information provided by the RF antennas to provide precise vehicle location information to other vehicles or objects. To combine the GPS position, which is determined by the GPS antenna, and the ranging measurements, which are based on the location of and the communications generated by the RF antennas, it is useful to know the geometry, or physical relationship, between the GPS antenna and the RF antennas. For example, it may be desirable for the vehicle to have the ability to broadcast to other vehicles or objects information relating to the relative position of the GPS antenna(s) and the RF antennas. Alternatively, the vehicle may take that information relating to the relative position of the GPS antenna(s) and the RF antennas into account when announcing the vehicle's position or location.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services; however, as those skilled in the art will readily appreciate, the various concepts presented throughout this disclosure may be extended to networks providing circuit-switched services. Moreover, while an LTE network is illustrated as an example, other types of networks may also be used, including, for example only, a 5G network.

The E-UTRAN 104 includes a base station, such as, for example, the evolved Node B (eNB) 106 and other eNBs 108, which may include a gNodeB (gNB), a Home NodeB, a Home eNodeB, or a base station using some other suitable terminology. For example, in a 5G or New Radio (NR) network, a base station may be referred to as a gNB. The E-UTRAN 104 may also include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, a drone, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
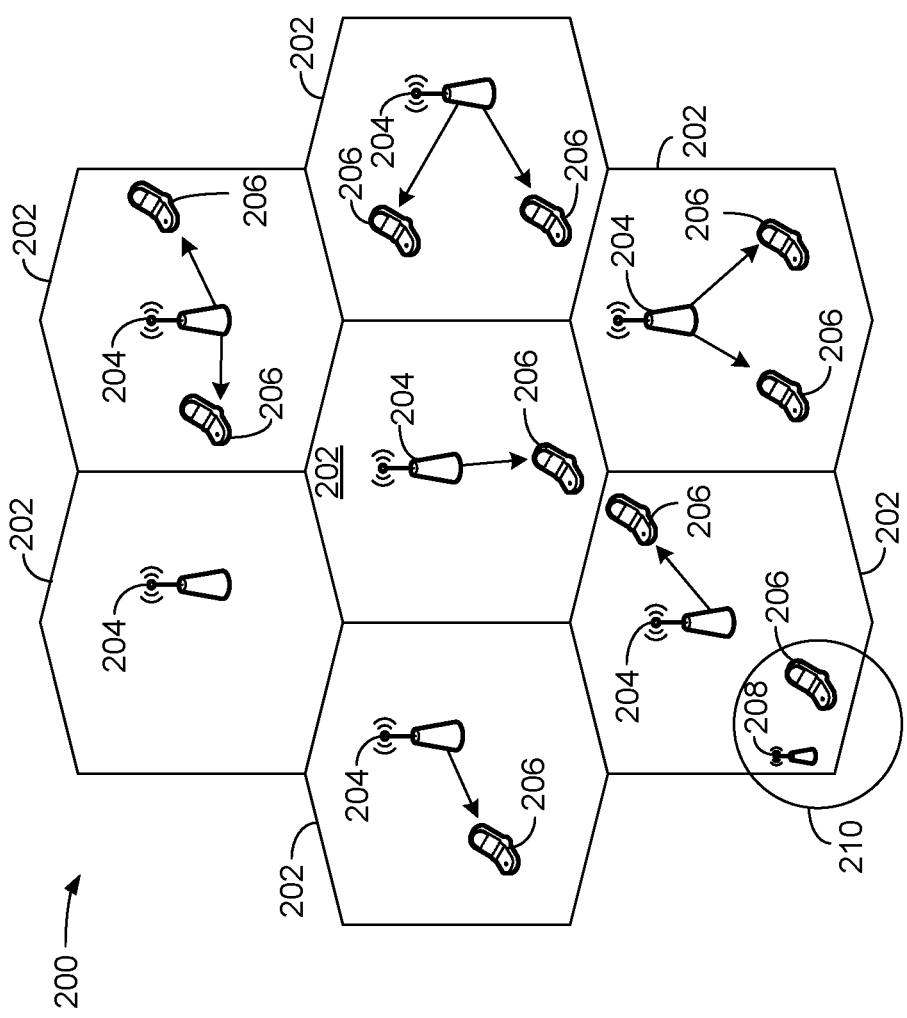
FIG. 2 is a diagram illustrating an example of an access network, in accordance with various aspects of the present disclosure.

FIG. 2 is a diagram illustrating an example of an access network 200 in an LTE network architecture. In this example, the access network 200 is divided into a number of cellular regions (cells) 202. One or more lower power class eNBs/gNBs 208 may have cellular regions 210 that overlap with one or more of the cells 202. The lower power class eNB/gNB 208 may be a femto cell (e.g., home eNB (HeNB)), pico cell, micro cell, or remote radio head (RRH). The macro eNBs/gNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs/gNBs 204 are responsible for all radio related functions including radio bearer control, admission control, mobility control, scheduling, security, and connectivity to the serving gateway 116. An eNB/gNB may support one or multiple (e.g., three) cells (also referred to as a sectors). The term "cell" can refer to the smallest coverage area of an eNB/gNB and/or an eNB/gNB subsystem serving a particular coverage area. Further, the terms "eNB," "gNB," "base station," and "cell" may be used interchangeably herein.

The modulation and multiple access scheme employed by the access network 200 may vary depending on the particular telecommunications standard being deployed. In LTE applications, OFDM is used on the DL (downlink) and SC-FDMA is used on the UL (uplink) to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO), Ultra Mobile Broadband (UMB), 5G, or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs/gNBs 204 may have multiple antennas supporting MIMO technology. The use of MIMO technology enables the eNBs/gNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB/gNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
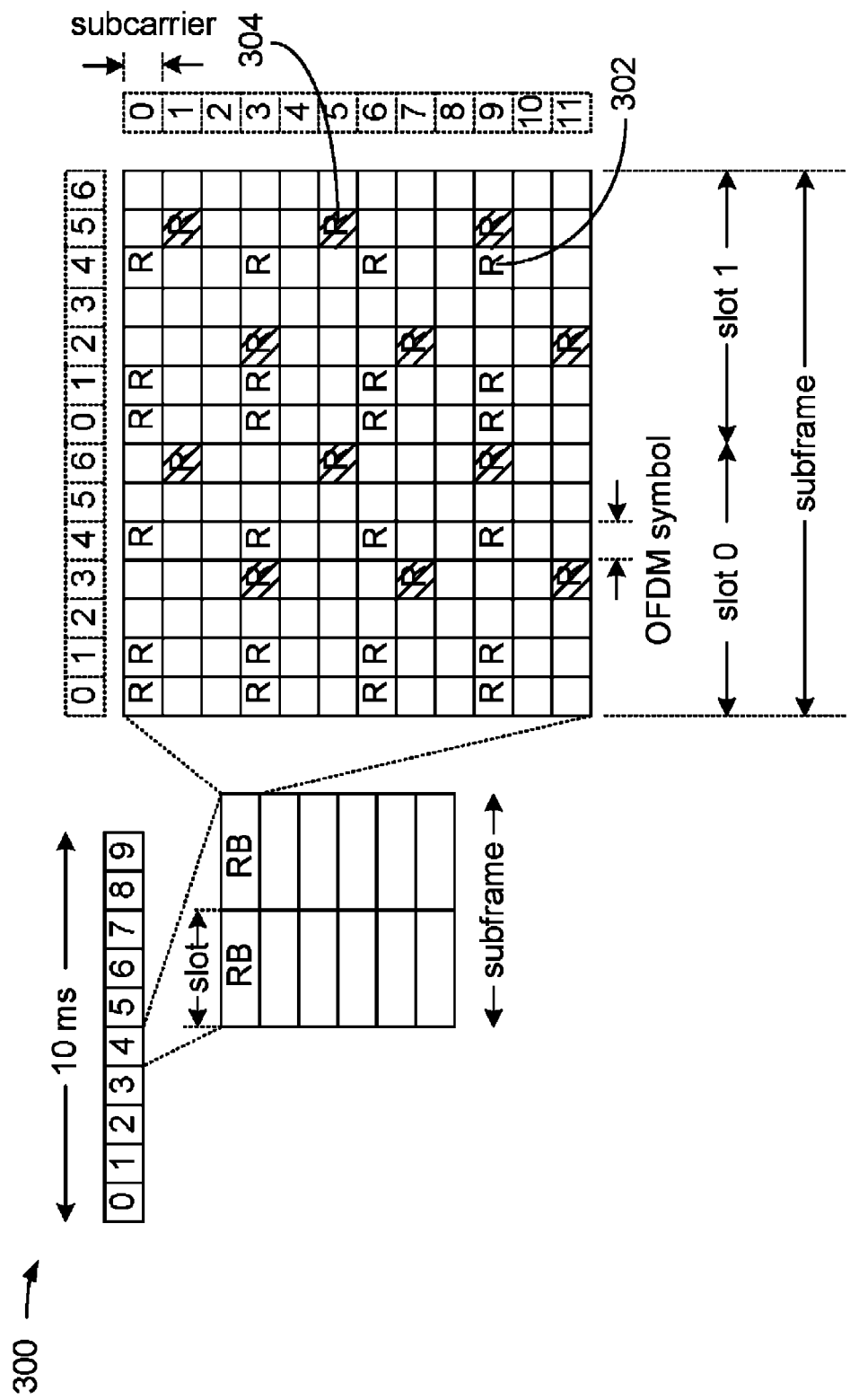
FIG. 3 is a diagram illustrating an example of a DL frame structure in LTE, in accordance with various aspects of the present disclosure.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. In other exemplary communication systems, such as, for example, a 5G or a NR communication system, other numbers of subcarriers in the frequency domain and symbols in the time domain, providing other numbers of resource elements are possible. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
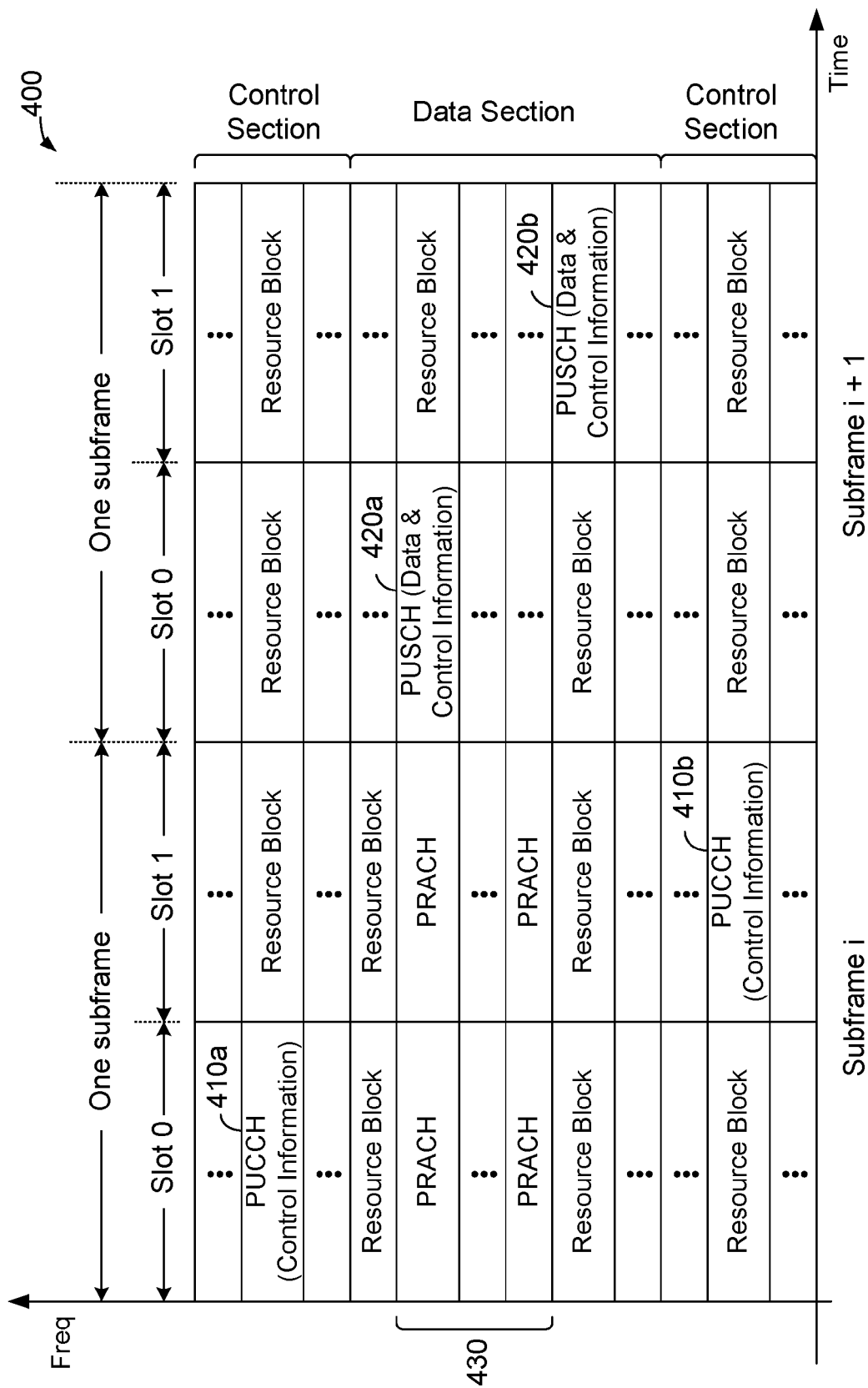
FIG. 4 is a diagram illustrating an example of an UL frame structure in LTE, in accordance with various aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB/gNB. The UE may also be assigned resource blocks 420a, 420b in the data section to transmit data to the eNB/gNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
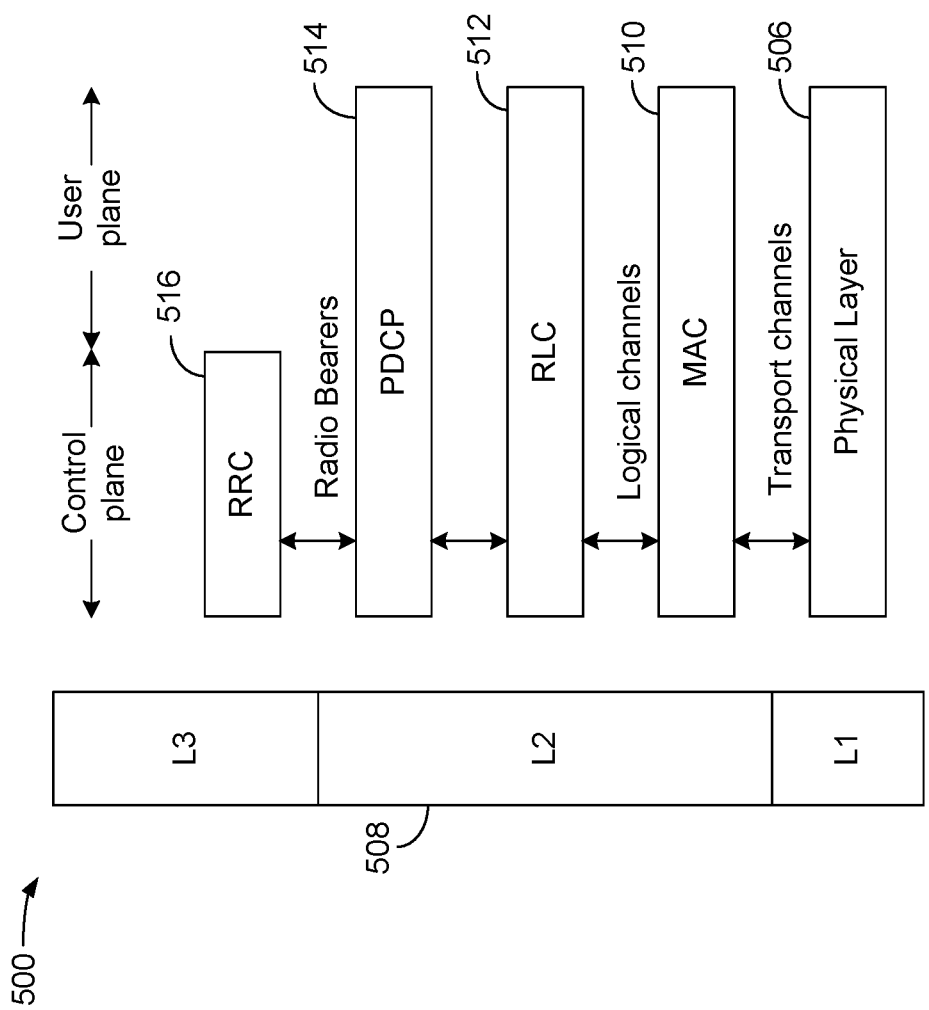
FIG. 5 is a diagram illustrating an example of a radio protocol architecture for the user and control planes in accordance with various aspects of the present disclosure.

FIG. 5 is a diagram 500 illustrating an example of a radio protocol architecture for the user and control planes in LTE in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
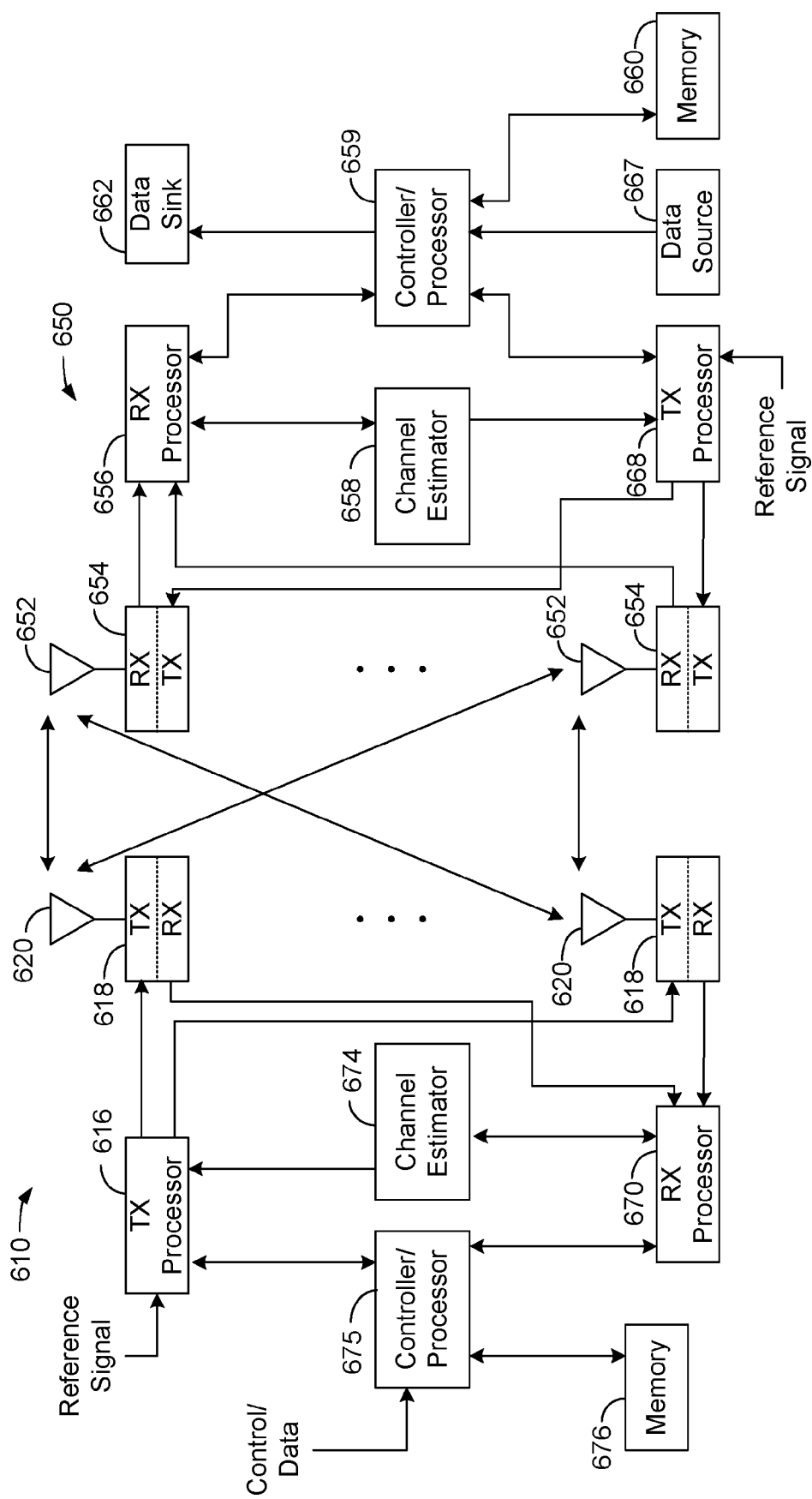
FIG. 6 is a diagram illustrating an example of an evolved Node B and user equipment in an access network in accordance with various aspects of the present disclosure.

FIG. 6 is a block diagram of an eNB/gNB 610 in communication with a UE 650 in an access network in accordance with various aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
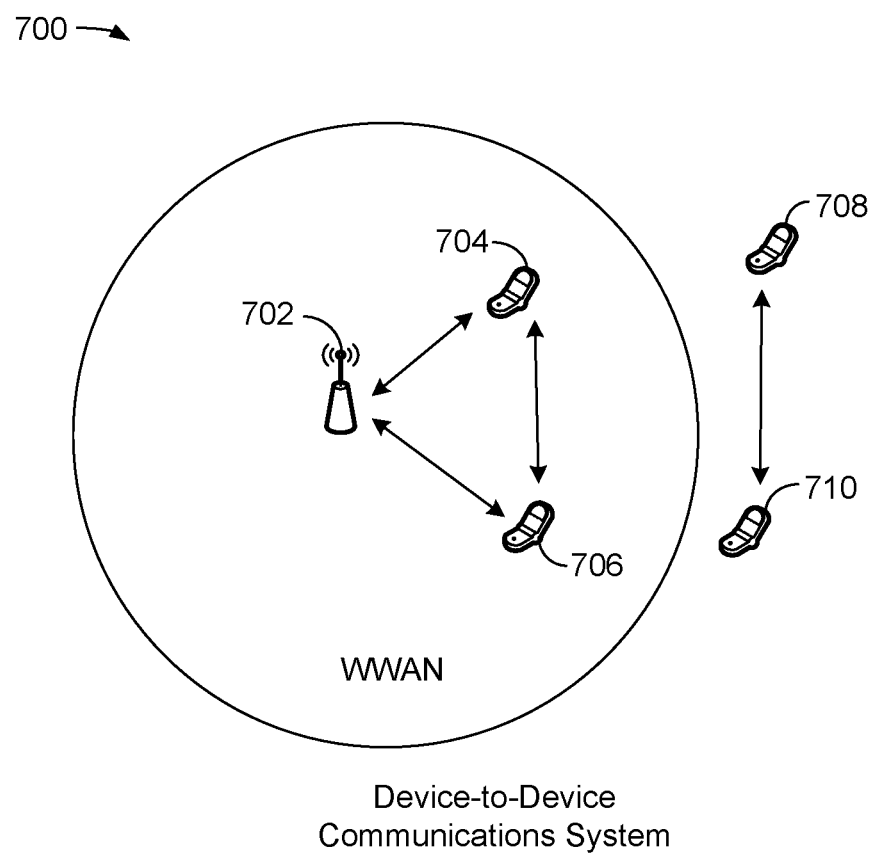
FIG. 7 is a diagram of a device-to-device communications system in accordance with various aspects of the present disclosure.

FIG. 7 is a diagram of a device-to-device (D2D) communications system 700 in accordance with various aspects of the present disclosure. The device-to-device communications system 700 may be implemented by the network shown in FIG. 1, and, in an exemplary embodiment, includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device (or peer-to-peer) communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

In one configuration, some or all of the UEs 704, 706, 708, 710 may be equipped or located on vehicles. In such a configuration, the D2D communications system 700 may also be referred to as a vehicle-to-vehicle (V2V) communications system.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Future generations of vehicles capable of autonomous driving or operation will demand collision avoidance capability that uses centimeter-level accuracy in vehicle positioning or locating, such as, for example, low-centimeter ranges such as less than one centimeter to a few centimeters. However, the accuracy of current GPS positioning is about 2-3 meters in open sky conditions.

To improve positioning accuracy to the order centimeter-level accuracy, peer-to-peer ranging among vehicle UEs can be combined with GPS positioning. Ranging refers to a distance estimation between vehicles. For example, a vehicle may transmit a ranging signal, and other vehicles or objects may estimate the distances to the transmitting vehicle based on the time of arrival (TOA) of the ranging signal. Other techniques such as time difference of arrival (TDOA) may also be used.

Since ranging signals are transmitted by radio frequency (RF) antennas, estimated ranging distances are actually between RF antennas of different vehicles. Further, the GPS position of a vehicle is in fact the position of the vehicle's GPS antenna. Since the separations between different antennas (GPS antenna and one or more RF antennas) on the same vehicle may be on the order of meters, given the goal of centimeter-level positioning accuracy, the accurate positions of the different antennas should be signaled, or otherwise communicated, to proximal vehicles. In other words, considering the centimeter-level positioning accuracy desired, a vehicle should not be treated as a single point. Instead, treating a vehicle body as an array of points or a locus of points, including the location or position of various objects on the array or locus of points, may be desired.

Figure 8A:
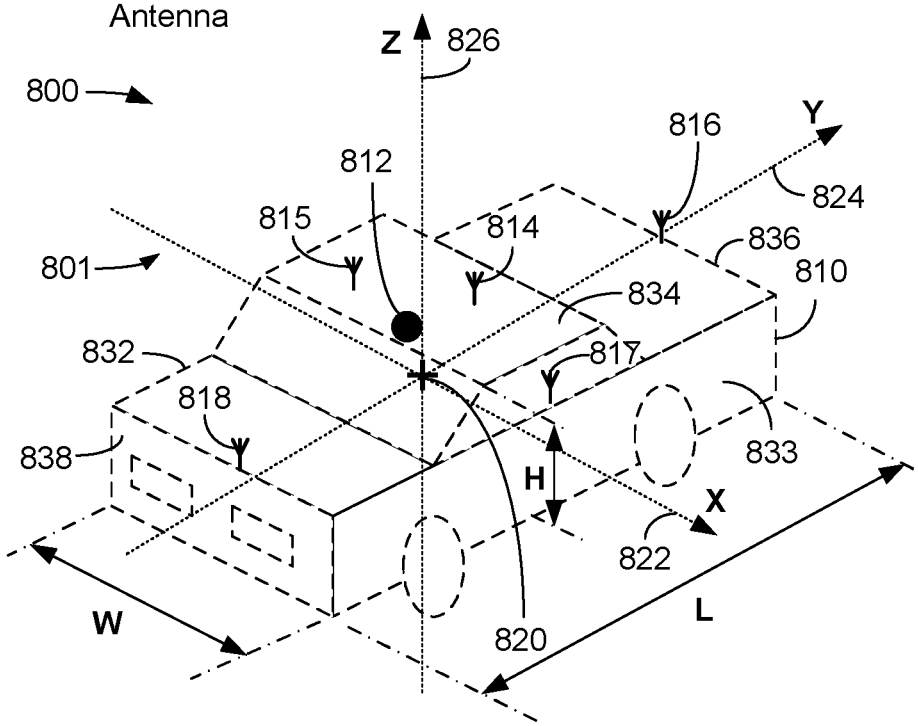
FIG. 8A is a schematic diagram illustrating a vehicle for use in device-to-device communications, in accordance with various aspects of the present disclosure.

FIG. 8A is a schematic diagram 800 illustrating a vehicle for use in device-to-device communications, in accordance with various aspects of the present disclosure. In an exemplary embodiment, the device in FIG. 8A can be a UE and can be located on, located in, or can comprise a vehicle 810. In an exemplary embodiment, the vehicle 810 may comprise a GPS antenna 812, and one or more radio frequency (RF) antennas. In an exemplary embodiment, the vehicle 810 may comprise RF antennas 814, 815, 816, 817, and 818, configured to perform vehicle-to-vehicle (V2V) ranging, vehicle-to-everything (V2X) ranging, or other vehicle ranging operations to determine one or more ranging measurements. However, the vehicle 810 may comprise more or fewer RF antennas. In an exemplary embodiment, the RF antennas 814, 815, 816, 817, and 818 may be located generally at the periphery, sides, corners, or edges, of the vehicle 810. For example, the RF antenna 814 may be located on the roof of the vehicle 810. The RF antenna 815 may be located on one side of the vehicle 810, for example, the driver's side for a left-hand drive vehicle 810. The RF antenna 816 may be located on the front edge of the vehicle 810. The RF antenna 817 may be located on one side of the vehicle 810, for example, the passenger side for a left-hand drive vehicle 810. The RF antenna 818 may be located on the rear edge of the vehicle 810.

In an exemplary embodiment, a three-dimensional (3D) rectangular coordinate system 801 is shown with reference to the vehicle 810. A first axis 822 may be referred to as the X-axis 822, a second axis 824 may be referred to as the Y-axis 824 and a third axis 826 may be referred to as the Z-axis 826. The axis nomenclature is arbitrary and other three-dimensional coordinate systems may be used. The RF antennas 814, 815, 816, 817 and 818 may be in operative communication with one or more base stations (for example, one or more eNBs/gNBs shown, for example, in FIG. 1 and FIG. 2), or one or more UEs (also shown, for example, in FIG. 1 and in FIG. 2).

The point at which the X-axis 822, Y-axis 824 and the Z-axis 826 intersect may be referred to as the "origin 820." The location of the origin 820 is generally arbitrary, but is preferably substantially centrally located within a volume defining the outer periphery of the vehicle 810.

In an exemplary embodiment, the vehicle 810 generally has a length, L, which extends along the Y-axis 824, a width, W, which extends along the X-axis 822, and a height, H, which extends along the Z-axis 826. The length, L, width, W, and height, H, of the vehicle 810 are known.

In an exemplary embodiment, given the coordinate system 801 with the origin 820 and the orientation of the X-axis 822, Y-axis 824 and Z-axis 826, the three-dimensional locations of the GPS antenna 812 and RF antennas 814, 815, 816, 817 and 818 with respect to the origin 820 are known or can be measured. Each three-dimensional location of the GPS antenna 812 and RF antennas 814, 815, 816, 817 and 818 comprises three-dimensional coordinates that can be defined with respect to the coordinate system 801 using the location of the origin 820 and the orientation of the X-axis 822, Y-axis 824 and Z-axis 826. Similarly, the three-dimensional locations of the vehicle edges (e.g., the sides 832, 833, top 834, front 836 and the rear 838, as well as the vehicle corners), or the location of other features or structural elements of the vehicle can also be determined.

The three-dimensional location or locations of the RF antennas 814, 815, 816, 817 and 818 relative to the GPS antenna 812, and, if obtained, the three-dimensional location or locations of other elements or features of the vehicle 810, such as the locations of the periphery and/or the edges of the vehicle 810, can be used to generate enhanced vehicle location information, such as, the generation of a reference frame, or wireframe of the vehicle 810 defining the boundary or boundaries of the vehicle 810. For example, the locations of the RF antennas, 814, 815, 816, 817 and 818, or other elements, structural elements, or features of the vehicle 810, can be provided to, or can be determined by the controller/processor 659 and the memory 660 of FIG. 6. Using the location of the origin 820, the locations of the GPS antenna 812, the locations of the RF antennas, 814, 815, 816, 817 and 818, and/or the locations of other elements, structural elements, or features of the vehicle 810, the controller/processor 659 may then develop or generate a reference frame, such as a wireframe, of the vehicle 810, the reference frame defining the boundary or boundaries of the vehicle 810.

This enhanced vehicle location information may include, in an exemplary embodiment, the GPS location of the GPS antenna 812, the locations of the RF antennas 814, 815, 816, 817 and 818, the relationship between the GPS antenna 812 and some or all of the RF antennas 814, 815, 816, 817 and 818, and the locations of vehicle edges 832, 833, 834, 836 and 838, or the locations of other structural elements, the locations of some or all of which can be combined into a communication message and transmitted by the vehicle 810 to other UEs, and more particularly, to other vehicles or objects. For example, referring to FIG. 6, the enhanced vehicle location information may be generated by the controller/processor 659, perhaps stored in the memory 660, and can be provided to the TX processor 668 for transmission to either or both of the eNB 610, or to another UE 650. A UE 650 (FIG. 6), or in particular, a vehicle receiving this enhanced vehicle location information may use the enhanced vehicle location information to more precisely define the location and position of the transmitting vehicle and the location and position of the receiving vehicle relative to the transmitting vehicle. Although illustrated as an automobile, the vehicle 810 may be another type of vehicle, such as, for example, a drone, a manned or an unmanned aerial vehicle, a remote controlled vehicle, or any other vehicle.

In an alternative exemplary embodiment, the GPS location of the vehicle 810, the locations of the RF antennas 814, 815, 816, 817 and 818, and the locations of vehicle edges 832, 833, 834, 836 and 838 can be separately transmitted by the vehicle 810, or can be combined into a communication message and transmitted by the TX processor 668 to either or both of the eNB 610, or to another UE 650.

In an exemplary embodiment, the enhanced vehicle location information may be incorporated into the basic safety message (BSM) transmitted by a vehicle 810 to either or both of the eNB 610, or to another UE 650.

Figure 8B:
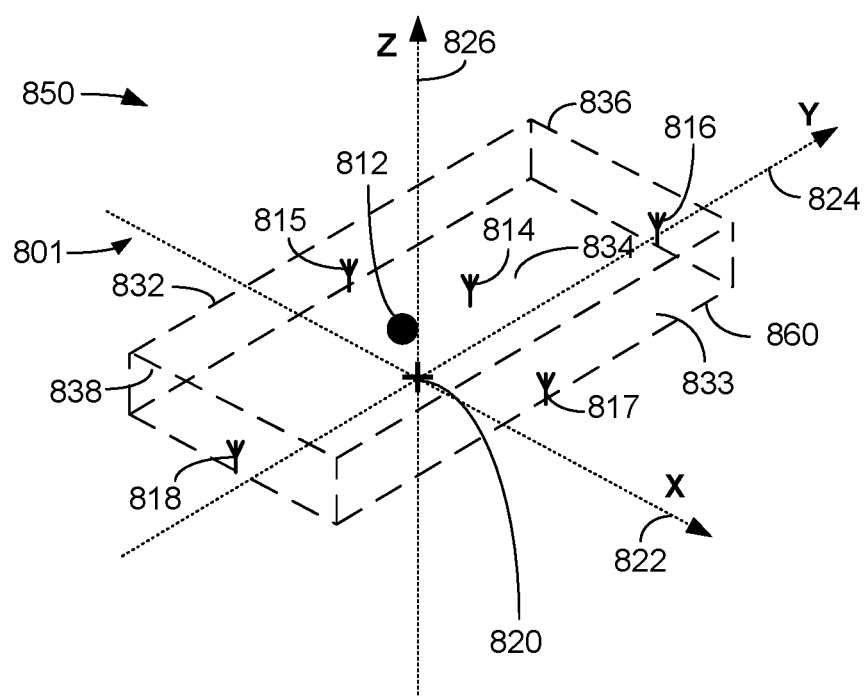
FIG. 8B is a schematic diagram illustrating an exemplary reference frame of the vehicle of FIG. 8A, in accordance with various aspects of the present disclosure.

FIG. 8B is a schematic diagram 850 illustrating an exemplary reference frame of the vehicle of FIG. 8A, in accordance with various aspects of the present disclosure. In an exemplary embodiment, the controller/processor 659 and memory 660 of FIG. 6 may use the three-dimensional coordinates of the GPS antenna 812 and RF antennas 814, 815, 816, 817 and 818 (FIG. 8A) to generate a reference frame 860. The reference frame 860 may be a simple geometric construction that can be used to define the boundaries, or periphery of the volume of the vehicle 810 and, in an exemplary embodiment, may comprise an array or locus of points that may be included in the enhanced vehicle location information transmitted to other vehicles by the vehicle 810 (FIG. 8A). The reference frame 860 may be generated by knowing the location of the GPS antenna 812, and the locations of the RF antennas 814, 815, 816, 817 and 818, even though the RF antennas may not be located at the "corners" of the vehicle 810 (FIG. 8A).

Figure 9:
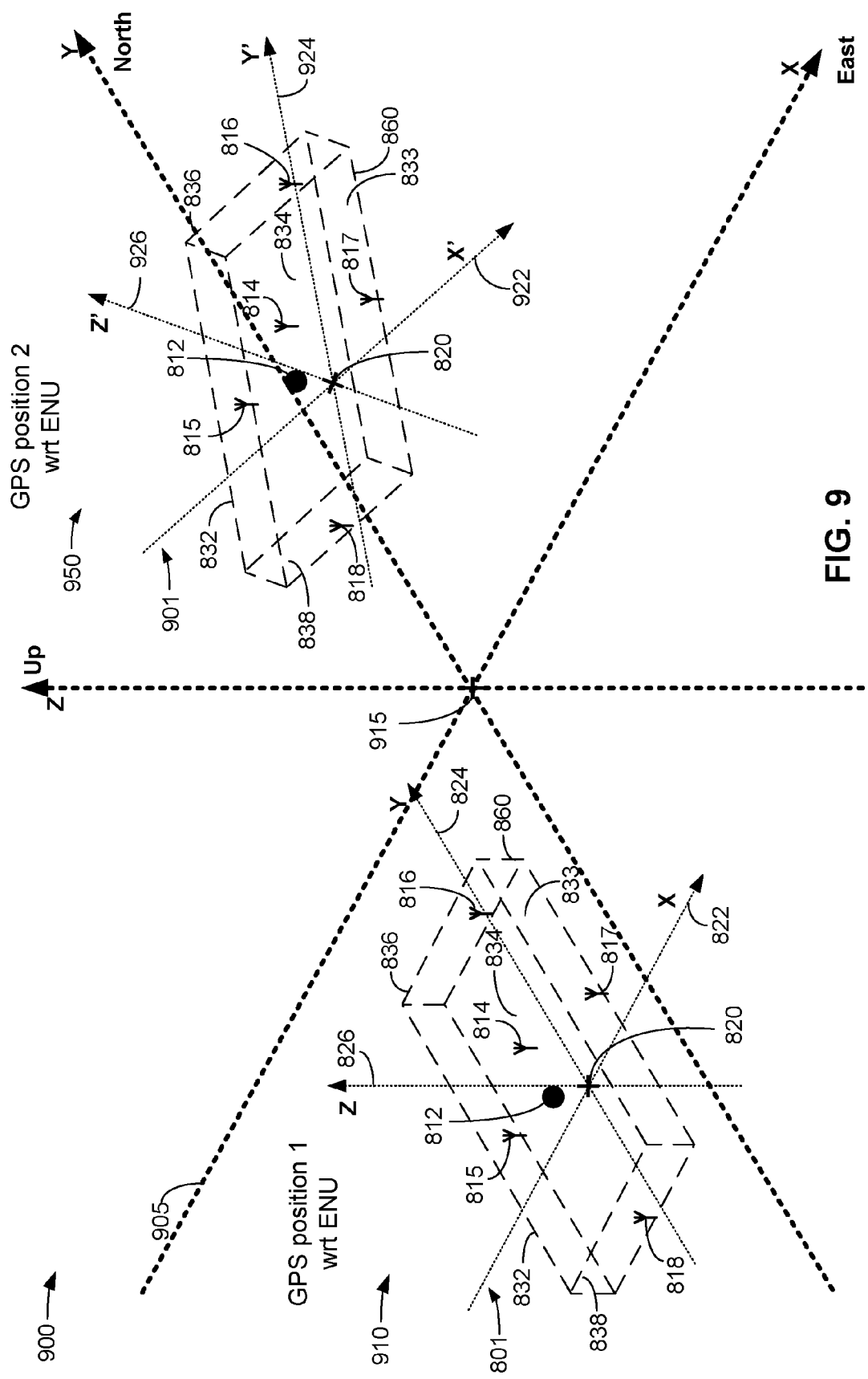
FIG. 9 is a schematic diagram illustrating an exemplary vehicle and reference frame of FIGS. 8A and 8B at multiple GPS locations, in accordance with various aspects of the present disclosure.

FIG. 9 is a schematic diagram 900 illustrating an exemplary reference frame of FIG. 8B at multiple GPS locations, in accordance with various aspects of the present disclosure. In an exemplary embodiment, the vehicle 810 (FIG. 8A) may be represented in FIG. 9 using the reference frame 860, and may be located within a global coordinate system 905. As used herein, the term "global coordinate system" refers to a common coordinate system that can be used to identify the positions of a vehicle and/or the positions of multiple vehicles, and to identify the positions of antennas or other features of the vehicle and/or vehicles using a common coordinate system. In an exemplary embodiment, the global coordinate system 905 may comprise what is referred to as an ENU (East North Up) coordinate system which may comprise the coordinates Up (Z axis), with "Up" having positive values and "Down" having negative values with respect to the origin 915, North (Y axis), with North having positive values and South having negative values with respect to the origin 915, and East (X axis), with East having positive values and West having negative values with respect to the origin 915. An ENU coordinate system is a commonly known and understood navigation coordinate system, and the term global ENU coordinate system may also be used to refer to the global coordinate system 905. As a vehicle moves and changes location or position, the GPS tracking system on the vehicle provides continuous GPS position information, generally using a predetermined periodicity determined by the GPS system. As the vehicle passes through multiple locations or as multiple vehicles pass through multiple locations, the global coordinate system 905 may be used as a common reference system for GPS position information of the vehicle or vehicles, and for objects on the vehicle or vehicles. The global ENU coordinate system is shown as one example of a global coordinate system 905.

In an exemplary embodiment, the GPS position of the reference frame 860, the position of the GPS antenna 812 and the positions of the RF antenna(s) and other objects on or associated with the reference frame 860, may be expressed as locations in the global coordinate system 905, such that a vehicle that passes through multiple locations or multiple vehicles that may pass through multiple locations may have the multiple GPS coordinates of their multiple antennas and other features mapped or otherwise translated to corresponding positions in the global coordinate system 905. Mapping or otherwise translating the GPS coordinates of the multiple antennas and other features of a vehicle 810 (FIG. 8A) to positions in a global coordinate system 905 allows vehicles to exchange precise position information of their antennas or other features using the global coordinate system 905 to accurately depict the position of the antennas or other features of the vehicle 810 (FIG. 8A) using a common coordinate system. With regard to FIG. 9, the reference frame 860 is illustrated as occupying two different positions, or locations, within the global coordinate system 905 at two different times. The reference frame 860 also has a local coordinate system 801 shown using the axes X, Y and Z at a first position or location 910, and a local coordinate system 901 shown using the axes X', Y', and Z' at a second position or location 950. In an exemplary embodiment, a vehicle 810 (FIG. 8A) may broadcast to other vehicles, its position or positions, the positions or locations of its antennas, or the position or positions of other features of the vehicle 810 within the global coordinate system 905.

For example, when in the first position 910, the locations of the GPS antenna 812 and the positions of the RF antennas 814, 815, 816, 817 and 818 are determined with respect to the local coordinate system 801, and are then mapped to the global coordinate system 905, which then allows the vehicle 810 to create a representation of the reference frame 860 at the first position 910. Similarly, when in the second position 950, the locations of the GPS antenna 812 and the positions of the RF antennas 814, 815, 816, 817 and 818 are determined with respect to the local coordinate system 901, and are then mapped to the global coordinate system 905, which then allows the vehicle 810 to create a representation of the reference frame 860 at the second position 950. The mapping of the locations of the GPS antenna 812 and the positions of the RF antennas 814, 815, 816, 817 and 818 from the local coordinate system 801 to the global coordinate system 905, and the mapping of the locations of the GPS antenna 812 and the positions of the RF antennas 814, 815, 816, 817 and 818 from the local coordinate system 901 to the global coordinate system 905 uses the knowledge of the position and orientation of the local coordinate systems 801 and 901 with respect to the global coordinate system 905, and such knowledge may be provided by the vehicle's GPS system. In accordance with an exemplary embodiment, the local coordinate system 801 corresponds to the reference frame 860 when in the first location 910 and the local coordinate system 901 corresponds to the reference frame 860 when in the second location 950. The local coordinate system 901 is shown as being rotated with respect to the local coordinate system 801 to depict that the reference frame 860 in the second location 950 is oriented differently than the reference frame 860 in the first location 910 because as the vehicle 810 moves, it's orientation within the global coordinate system 905 changes. In this manner, the movement of the GPS antenna 812 and the movement of the RF antennas 814, 815, 816, 817 and 818 from the first position 910 to the second position 950 can be determined and tracked with respect to the global coordinate system 905. Determining the precise locations of the GPS antenna 812 and the RF antennas 814, 815, 816, 817 and 818 allows a vehicle 810 (FIG. 8A) to broadcast the precise locations of the GPS antenna 812 and the RF antennas 814, 815, 816, 817 and 818, and other features, structural elements, or objects of the vehicle 810 (FIG. 8A), such as the boundaries of the vehicle 810, to other vehicles as part of the enhanced vehicle location information.

In an exemplary embodiment, and as an example only (using the locations of the GPS antenna and one of the RF antennas), and using arbitrary location values, with respect to the coordinate system 801, the location of the GPS antenna 812 may be X: −1, Y: 1, and Z: 2; and the location of the RF antenna 814 may be X: −1, Y: 2, Z: 2. These locations may be mapped to the global coordinate system 905. For example, the coordinates of the GPS antenna 812 in the coordinate system 801 may be mapped to the global coordinate system 905 as E: −2, N: −8, U: 2; and the coordinates of the RF antenna 814 in the coordinate system 801 may be mapped to the global coordinate system 905 as E: −2, N: −7, U: 2.

Similarly, as an example only (using the locations of the GPS antenna and one of the RF antennas), and using arbitrary location values, with respect to the coordinate system 901, the location of the GPS antenna 812 may be X':

−1, Y′: 1, and Z′: 2, and the location of the RF antenna 814 may be X′: −1, Y′: 2, Z′: 2. These locations may be mapped to the global coordinate system 905. For example, the coordinates of the GPS antenna 812 in the coordinate system 901 may be mapped to the global coordinate system 905 as E: 1, N: 5, U: 0; and the coordinates of the RF antenna 814 in the coordinate system 901 may be mapped to the global coordinate system 905 as E: 1, N: 6, U: −1. In this manner, the movement of a vehicle, or other UE, may be tracked and represented in the global coordinate system 905.

Figure 10:
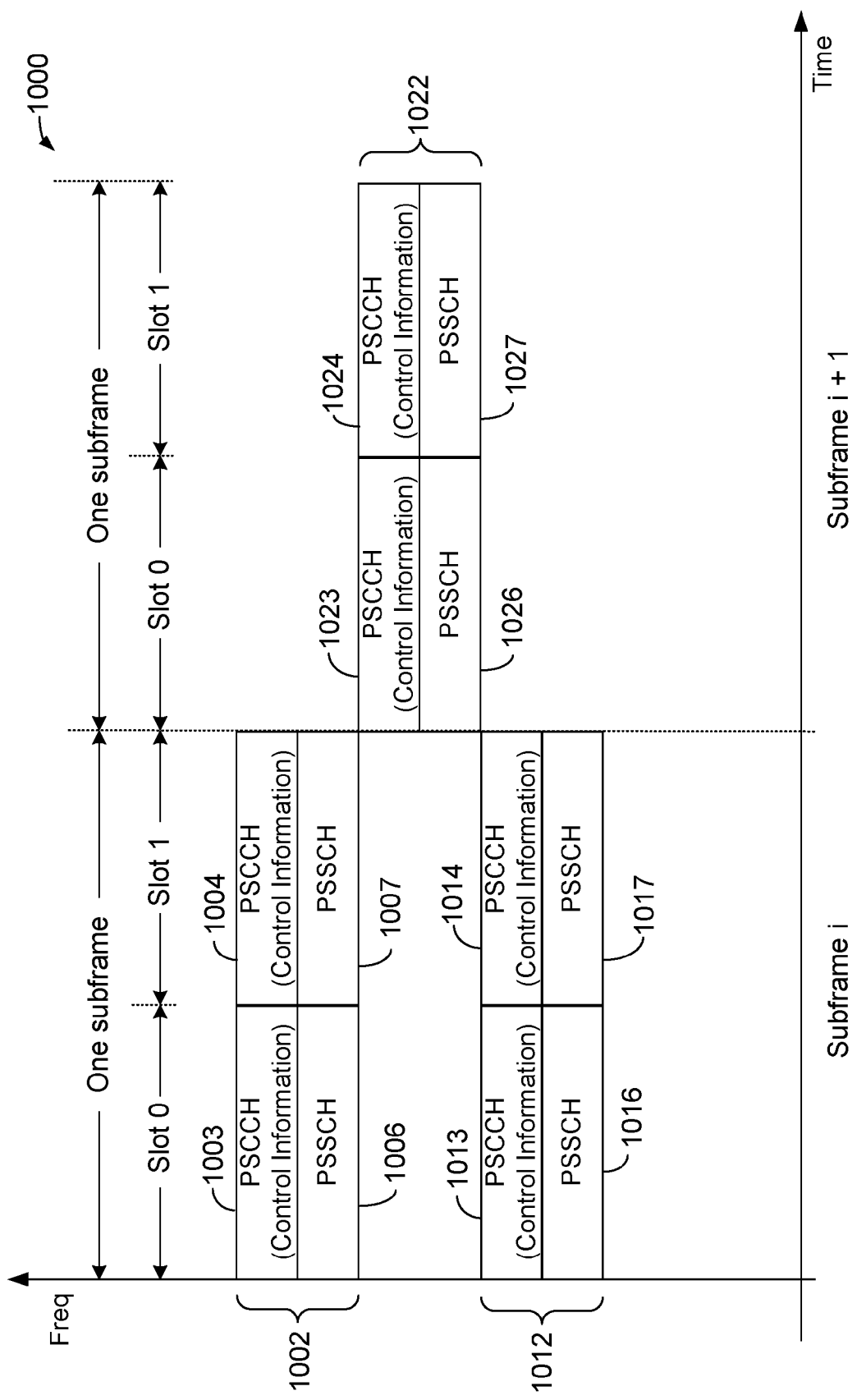
FIG. 10 is a diagram illustrating a data structure in accordance with various aspects of the present disclosure.

FIG. 10 is a diagram illustrating a data structure 1000 in accordance with various aspects of the present disclosure. In an exemplary embodiment, the data structure 1000 may comprise a number of radio resources that can be used for direct vehicle to vehicle (V2V) communication. These resources are generally referred to as "sidelink" resources and are used to communicate over a "sidelink channel" whereby a vehicle can communicate directly with another vehicle or object.

The data structure 1000 may comprise some or all of a sidelink communication and may also be referred to as a communication frame. In an exemplary embodiment, the data structure 1000 comprises a first subframe, subframe i, and a second subframe, subframe i+1. In an exemplary embodiment, the first subframe may comprise a transmission 1002 from a first exemplary vehicle, and a transmission 1012 from a second exemplary vehicle. In an exemplary embodiment, the transmission 1002 comprises a physical sidelink control channel (PSCCH) communication 1003 and a PSCCH communication 1004, and comprises a physical sidelink shared channel (PSSCH) communication 1006 and a PSSCH communication 1007. In an exemplary embodiment, the transmission 1002 comprises control information (PSCCH 1003 and 1004) indicating the resource blocks, modulation/coding scheme, etc., used by the PSSCH transmissions 1006 and 1007. The enhanced vehicle location information, including the precise location of the boundaries of the vehicle, may be transmitted in the PSSCH transmissions 1006 and 1007.

Similarly, in an exemplary embodiment, the transmission 1012 comprises a physical sidelink control channel (PSCCH) communication 1013 and a PSCCH communication 1014, and comprises a physical sidelink shared channel (PSSCH) communication 1016 and a PSSCH communication 1017. In an exemplary embodiment, the transmission 1012 comprises control information (PSCCH 1013 and 1014) indicating the resource blocks, modulation/coding scheme, etc., used by the PSSCH transmissions 1016 and 1017. The enhanced vehicle location information, including the precise location of the boundaries of the vehicle, may be transmitted in the PSSCH transmissions 1016 and 1017.

In an exemplary embodiment, the second subframe, subframe i+1, may comprise a transmission 1022 from a third exemplary vehicle. In an exemplary embodiment, the transmission 1022 comprises a physical sidelink control channel (PSCCH) communication 1023 and a PSCCH communication 1024, and comprises a physical sidelink shared channel (PSSCH) communication 1026 and a PSSCH communication 1027. In an exemplary embodiment, the transmission 1022 comprises control information (PSCCH 1023 and 1024) indicating the resource blocks, modulation/coding scheme, etc., used by the PSSCH transmissions 1026 and 1027. The enhanced vehicle location information, including the precise location of the boundaries of the vehicle, may be transmitted in the PSSCH transmissions 1026 and 1027. Although three exemplary transmissions associated with three exemplary vehicles are shown in FIG. 10, more or fewer than three vehicles may exchange the enhanced vehicle location information.

Figure 11:
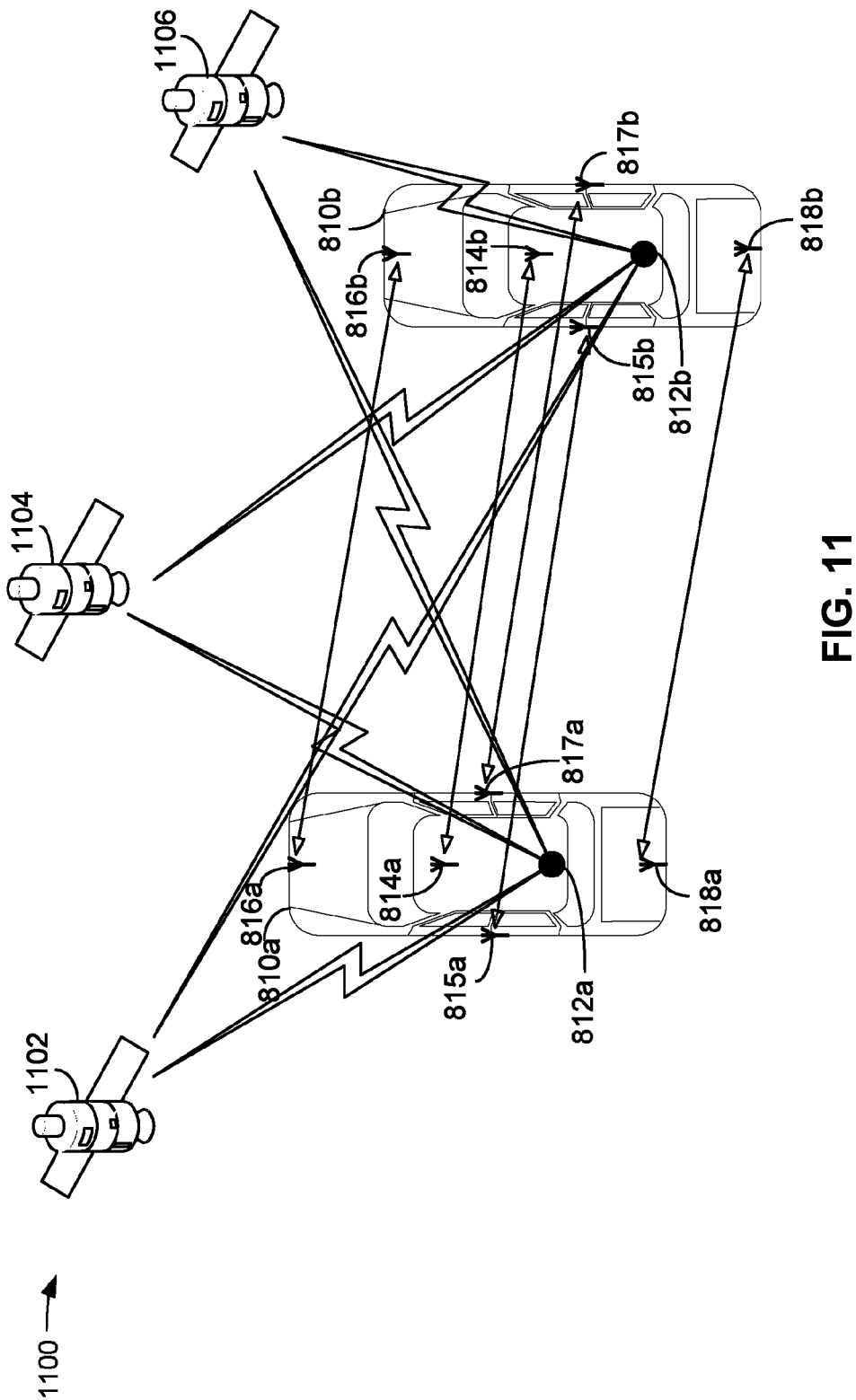
FIG. 11 is a schematic diagram illustrating a V2V communication system, in accordance with various aspects of the present disclosure.

FIG. 11 is a schematic diagram 1100 illustrating a V2V communication system, in accordance with various aspects of the present disclosure. The communication system 1100 comprises GPS satellites 1102, 1104 and 1106 in communication with two vehicles, a first vehicle 810a and a second vehicle 810b. Although only two vehicles are shown in FIG. 11, it should be understood that there may be more or fewer vehicles in such a communication system.

The first vehicle 810a may comprise a GPS antenna 812a, and one or more radio frequency (RF) antennas. In an exemplary embodiment, the first vehicle 810a may comprise RF antennas 814a, 815a, 816a, 817a and 818a. In an exemplary embodiment, the RF antennas 814a, 815a, 816a, 817a and 818a may be located at generally the periphery, or edges, of the first vehicle 810a. For example, the RF antenna 814a may be located on the roof of the first vehicle 810a. The RF antenna 815a may be located on one side, for example, the driver's side for a left-hand drive first vehicle 810a. The RF antenna 816a may be located on the front edge of the first vehicle 810a. The RF antenna 817a may be located on one side, for example, the passenger side for a left-hand drive first vehicle 810a. The RF antenna 818a may be located on the rear edge of the first vehicle 810a. In an exemplary embodiment, the first vehicle 810a may be an embodiment of the vehicle 810 of FIG. 8A.

The second vehicle 810b may comprise a GPS antenna 812b, and one or more radio frequency (RF) antennas. In an exemplary embodiment, the second vehicle 810b may comprise RF antennas 814b, 815b, 816b, 817b and 818b. In an exemplary embodiment, the RF antennas 814b, 815b, 816b, 817b and 818b may be located at generally the periphery, or edges, of the second vehicle 810b. For example, the RF antenna 814b may be located on the roof of the second vehicle 810b. The RF antenna 815b may be located on one side, for example, the driver's side for a left-hand drive second vehicle 810b. The RF antenna 816b may be located on the front edge of the second vehicle 810b. The RF antenna 817b may be located on one side, for example, the passenger side for a left-hand drive second vehicle 810b. The RF antenna 818b may be located on the rear edge of the second vehicle 810b. In an exemplary embodiment, the second vehicle 810b may be an embodiment of the vehicle 810 of FIG. 8A.

In an exemplary embodiment, the first vehicle 810a and the second vehicle 810b are in operative communication with GPS satellites 1102, 1104 and 1106. Although three GPS satellites are shown in FIG. 11, more or fewer GPS satellites may be in operative communication with the first vehicle 810a and the second vehicle 810b. In an exemplary embodiment, the GPS antenna 812a on the first vehicle 810a generates a GPS location. Similarly, the GPS antenna 812b on the second vehicle 810b generates a GPS location.

In an exemplary embodiment, the RF antennas 814a, 815a, 816a, 817a and 818a each transmit a ranging signal using distinct radio parameters, or radio resources, which can differentiate the ranging signal transmitted by each of the RF antennas 814a, 815a, 816a, 817a and 818a. Similarly, the RF antennas 814b, 815b, 816b, 817b and 818b each transmit a ranging signal using distinct radio parameters, or radio resources that can differentiate the ranging signal transmitted by each of the RF antennas 814b, 815b, 816b, 817b and 818b.

In an exemplary embodiment, the RF antenna 814a transmits a ranging signal that can be received and decoded by the RF antenna 814b. Similarly, the RF antenna 814b transmits a ranging signal that can be received and decoded by the RF antenna 814a.

In an exemplary embodiment, the RF antenna 815a transmits a ranging signal that can be received and decoded by the RF antenna 815b. Similarly, the RF antenna 815b transmits a ranging signal that can be received and decoded by the RF antenna 815a.

In an exemplary embodiment, the RF antenna 816a transmits a ranging signal that can be received and decoded by the RF antenna 816b. Similarly, the RF antenna 816b transmits a ranging signal that can be received and decoded by the RF antenna 816a.

In an exemplary embodiment, the RF antenna 817a transmits a ranging signal that can be received and decoded by the RF antenna 817b. Similarly, the RF antenna 817b transmits a ranging signal that can be received and decoded by the RF antenna 817a.

In an exemplary embodiment, the RF antenna 818a transmits a ranging signal that can be received and decoded by the RF antenna 818b. Similarly, the RF antenna 818b transmits a ranging signal that can be received and decoded by the RF antenna 818a.

In an exemplary embodiment, any of the RF antennas 814a, 815a, 816a, 817a and 818a can be configured to operatively communicate with any of the RF antennas 814b, 815b, 816b, 817b and 818b, and any of the RF antennas 814b, 815b, 816b, 817b and 818b can be configured to operatively communicate with any of the RF antennas 814a, 815a, 816a, 817a and 818a.

In an exemplary embodiment, at least one RF antenna on the first vehicle 810a performs a ranging operation to develop a ranging measurement with at least one RF antenna located on the second vehicle 810b. The ranging measurement can be included as part of the enhanced vehicle location information when transmitting the GPS location, the location of the at least one RF antenna, and the location of the structural element of the first vehicle 810a to the second vehicle 810b.

In an exemplary embodiment, each of the RF antennas 814a, 815a, 816a, 817a and 818a can be configured to transmit a communication message that includes the GPS coordinates, or location, developed by the GPS antenna 812a, and can also be configured to transmit enhanced vehicle location information that includes the locations of one or more of the RF antennas 814a, 815a, 816a, 817a and 818a relative to the location of the GPS antenna 812a, and/or the locations of the vehicle edges 832, 833, 834, 836 and 838, and/or a ranging measurement as described above.

In an exemplary embodiment, each of the RF antennas 814b, 815b, 816b, 817b and 818b can be configured to transmit a communication message that includes the GPS coordinates, or location, developed by the GPS antenna 812b, and can also be configured to transmit enhanced vehicle location information that includes the locations of one or more of the RF antennas 814b, 815b, 816b, 817b and 818b relative to the location of the GPS antenna 812b, and/or the locations of the vehicle edges 832, 833, 834, 836 and 838, and/or a ranging measurement, as described above. In this manner, a vehicle, such as the first vehicle 810a, can transmit its precise location to another vehicle, such as the second vehicle 810b.

Figure 12:
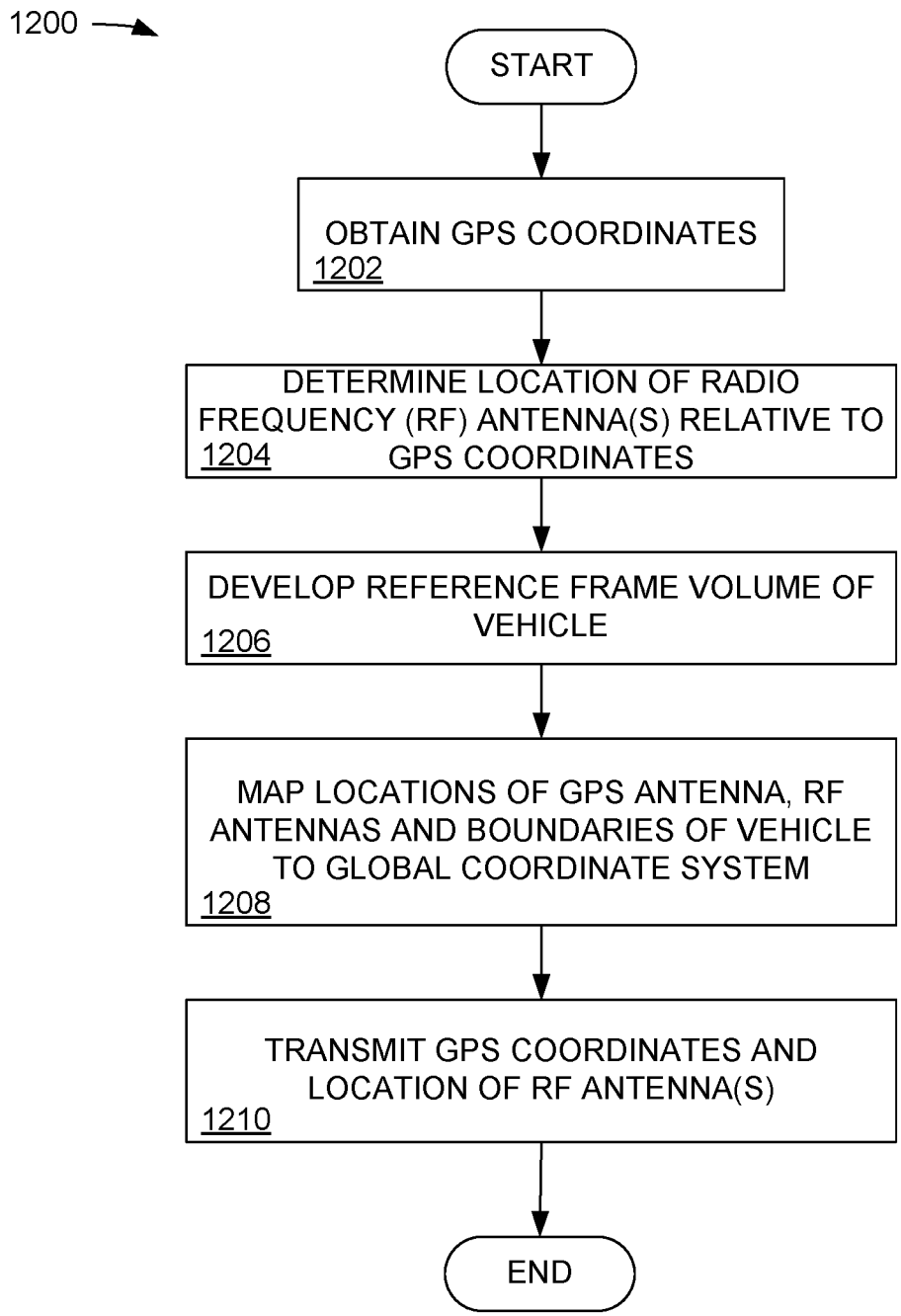
FIG. 12 is a flow chart illustrating an example of a method for communication, in accordance with various aspects of the present disclosure.

FIG. 12 is a flow chart illustrating an example of a method for communication, in accordance with various aspects of the present disclosure. The blocks in the method 1200 can be performed in or out of the order shown, and in some embodiments, can be performed at least in part in parallel.

In block 1202, a UE, such as a vehicle, may obtain GPS coordinates. For example, a vehicle 810 may use its GPS antenna 812 to obtain GPS coordinates, and the location, of the GPS antenna 812.

In block 1204, a location of one or more radio frequency (RF) antennas is determined relative to the GPS coordinates.

In block 1206, a reference frame, such as a wireframe of a vehicle, is determined. The reference frame of the vehicle may locate the precise locations of the RF antenna or antennas relative to the GPS antenna and the positions of the boundaries of the vehicle.

In block 1208, the precise locations of the RF antenna or antennas relative to the GPS antenna and the positions of the boundaries of the vehicle are mapped to a global coordinate system.

In block 1210, the GPS coordinates and the location of the one or more RF antenna is transmitted.

Figure 13:
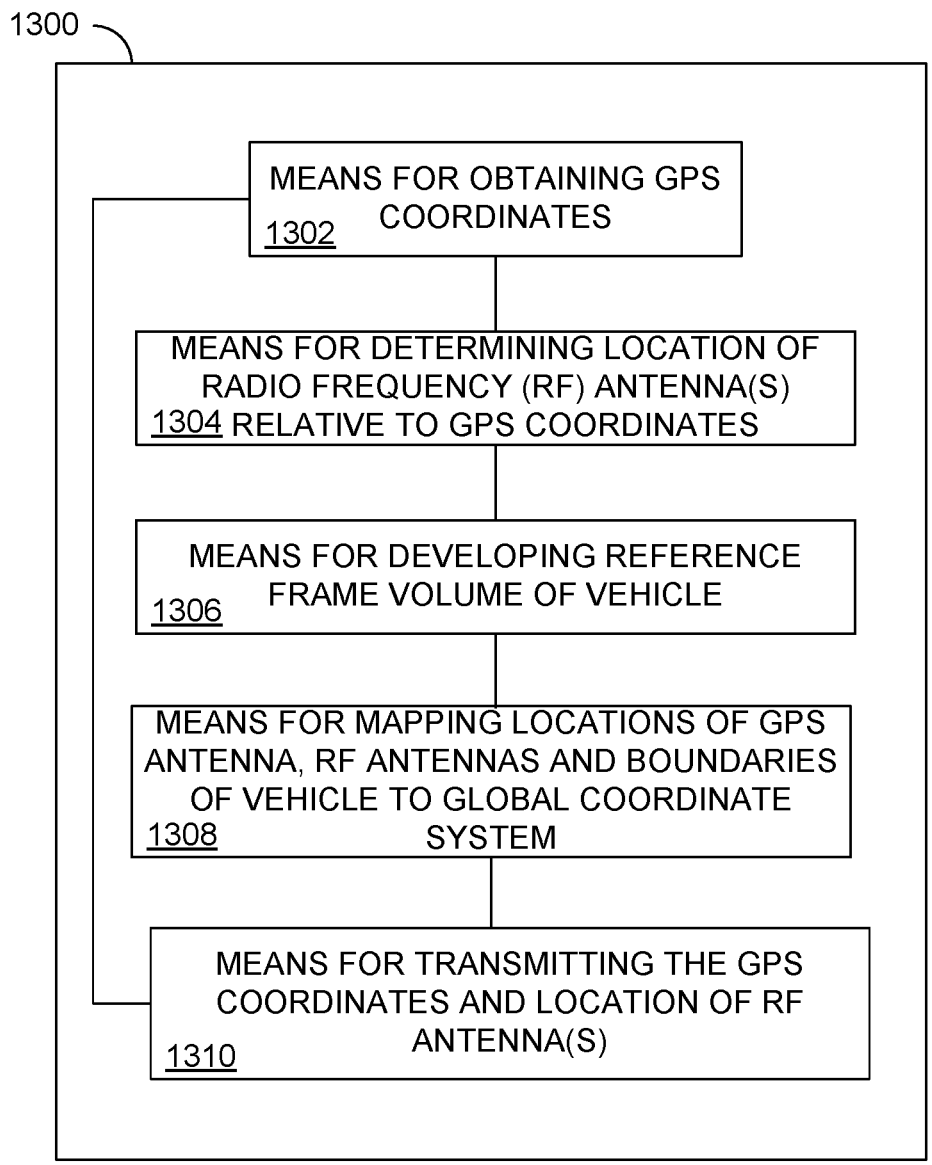
FIG. 13 is a functional block diagram of an apparatus for a communication system in accordance with various aspects of the present disclosure.

FIG. 13 is a functional block diagram of an apparatus 1300 for a communication system in accordance with various aspects of the present disclosure. The apparatus 1300 comprises means 1302 for obtaining GPS coordinates. In certain embodiments, the means 1302 for obtaining GPS coordinates can be configured to perform one or more of the function described in operation block 1202 of method 1200 (FIG. 12). In an exemplary embodiment, the means 1302 for obtaining GPS coordinates may comprise the GPS antenna, the RF antennas, the controller/processor and the memory of the communication system shown in FIG. 6, FIG. 8A and FIG. 11, and various embodiments thereof.

The apparatus 1300 further comprises means 1304 for determining a location of one or more radio frequency (RF) antennas relative to the GPS coordinates. In certain embodiments, the means 1304 for determining a location of one or more radio frequency (RF) antennas relative to the GPS coordinates can be configured to perform one or more of the function described in operation block 1204 of method 1200 (FIG. 12). In an exemplary embodiment, the means 1304 for determining a location of one or more radio frequency (RF) antennas relative to the GPS coordinates may comprise the GPS antenna, the RF antennas, the controller/processor and the memory of the communication system shown in FIG. 6, FIG. 8A and FIG. 11, and various embodiments thereof.

The apparatus 1300 further comprises means 1306 for developing a reference frame. In certain embodiments, the means 1306 for developing a reference frame can be configured to perform one or more of the function described in operation block 1206 of method 1200 (FIG. 12). In an exemplary embodiment, the means 1306 for developing a reference frame may comprise the GPS antenna, the RF antennas, the controller/processor and the memory of the communication system shown in FIG. 6, FIG. 8A and FIG. 11, and various embodiments thereof.

The apparatus 1300 further comprises means 1308 for mapping the precise locations of the RF antenna or antennas relative to the GPS antenna and the positions of the boundaries of the vehicle to a global coordinate system. In certain embodiments, the means 1308 for mapping the precise locations of the RF antenna or antennas relative to the GPS antenna and the positions of the boundaries of the vehicle to a global coordinate system can be configured to perform one or more of the function described in operation block 1208 of method 1200 (FIG. 12). In an exemplary embodiment, the means 1308 for mapping the precise locations of the RF antenna or antennas relative to the GPS antenna and the positions of the boundaries of the vehicle to a global coordinate system may comprise the GPS antenna, the RF antennas, the controller/processor and the memory of the communication system shown in FIG. 6, FIG. 8A and FIG. 11, and various embodiments thereof.

The apparatus 1300 further comprises means 1310 for transmitting the GPS coordinates and the location of the one or more RF antennas. In certain embodiments, the means 1310 for transmitting the GPS coordinates and the location of the one or more RF antennas can be configured to perform one or more of the function described in operation block 1210 of method 1200 (FIG. 12). In an exemplary embodiment, the means 1310 for transmitting the GPS coordinates and the location of the one or more RF antennas may comprise the GPS antenna, the RF antennas, the controller/processor and the memory of the communication system shown in FIG. 6, FIG. 8A and FIG. 11, and various embodiments thereof.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for developing and reporting enhanced user equipment (UE) location information, comprising:
    obtaining a global positioning system (GPS) location for a user equipment (UE) using a GPS antenna at a GPS antenna position relative to a local reference frame of the UE;
    receiving signals from a different user equipment using one or more radio frequency (RF) antennas, each of the one or more RF antennas at an associated RF antenna position relative to the local reference frame of the UE; and
    transmitting information indicative of the GPS location for the user equipment, the GPS antenna position, the RF antenna position for the one or more RF antennas and location information for at least one feature of a structure of the UE, wherein the local reference frame of the UE is defined with respect to the structure of the UE.

2. The method of claim 1, wherein the UE is a vehicle, wherein the reference frame is defined with respect to at least a length and width of the vehicle, and wherein the at least one feature of the structure is at least one feature selected from the group consisting of a corner and an edge of the vehicle.

3. The method of claim 1, wherein the UE is a vehicle, and wherein the one or more RF antennas are a plurality of RF antennas, and wherein receiving signals from a different user equipment comprises receiving the signals at more than one of the plurality of RF antennas.

4. The method of claim 1, further comprising determining information indicative of a range between the UE and the different UE.

5. The method of claim 1, wherein the GPS antenna position, RF antenna position for the one or more RF antennas, and the location information for the at least one feature of the structure of the UE are transmitted in a single communication message.

6. The method of claim 1, further comprising mapping the GPS antenna position, the RF antenna position for each of the one or more RF antennas, and the location information for the at least one feature of a structure of the UE to a global coordinate system.

7. The method of claim 1, further comprising generating a ranging measurement using the signals received from the different UE, and further comprising transmitting the ranging measurement.

8. An apparatus for developing and reporting enhanced user equipment (UE) location information, comprising:
    a global positioning system (GPS) configured to generate a GPS location for a user equipment (UE), the GPS system including a GPS antenna at a GPS antenna position relative to a local reference frame of the UE;
    one or more radio frequency (RF) antennas, each of the one or more RF antennas at an associated RF antenna position relative to the local reference frame of the UE; and
    a transmitter configured to transmit information indicative of the GPS location for the user equipment, the GPS antenna position, the RF antenna position for the one or more RF antennas and location information for at least one feature of a structure of the UE, wherein the local reference frame of the UE is defined with respect to the structure of the UE.

9. The apparatus of claim 8, wherein the UE is a vehicle, wherein the reference frame is defined with respect to at least a length and width of the vehicle, and wherein the at least one feature of the structure is at least one feature selected from the group consisting of a corner and an edge of the vehicle.

10. The apparatus of claim 8, wherein the UE is a vehicle, and wherein the one or more RF antennas are a plurality of RF antennas, and wherein receiving signals from a different user equipment comprises receiving the signals at more than one of the plurality of RF antennas.

11. The apparatus of claim 8, further comprising a processor to determine information indicative of a range between the UE and the different UE.

12. The apparatus of claim 8, wherein the transmitter is further configured to transmit the GPS antenna position, RF antenna position for the one or more RF antennas, and the location information for the at least one feature of the structure of the UE in a single communication message.

13. The apparatus of claim 8, wherein the GPS antenna position, the RF antenna position information for each of the one or more RF antennas, and the location information for the at least one feature of the structure of the UE are mapped to a global coordinate system.

14. The apparatus of claim 8, further comprising generating a ranging measurement using the signals received from the different UE, and further comprising transmitting the ranging measurement.

15. A device, comprising:
    means for obtaining a global positioning system (GPS) location for a user equipment (UE) using a GPS antenna at a GPS antenna position relative to a local reference frame of the UE;

means for receiving signals from a different user equipment (UE) using one or more radio frequency (RF) antennas, each of the one or more RF antennas at an associated RF antenna position relative to the local reference frame of the UE; and means for transmitting the GPS location for the user equipment, the GPS antenna position, the RF antenna position for the one or more RF antennas and location information for at least one feature of a structure of the UE, wherein the local reference frame of the UE is defined with respect to the structure of the UE.

16. The device of claim 15, wherein the UE is a vehicle, wherein the reference frame is defined with respect to at least a length and width of the vehicle, and wherein the at least one feature of the structure is at least one feature selected from the group consisting of a corner and an edge of the vehicle.

17. The device of claim 15, wherein the UE is a vehicle, and wherein the one or more RF antennas are a plurality of RF antennas, and wherein receiving signals from a different user equipment comprises receiving the signals at more than one of the plurality of RF antennas.

18. The device of claim 15, further comprising determining information indicative of a range between the UE and the different UE.

19. The device of claim 15, wherein the GPS antenna position, RF antenna position for the one or more RF antennas, and the location information for the at least one feature of the structure of the UE are transmitted in a single communication message.

20. The device of claim 15, further comprising means for mapping the GPS antenna position, the RF antenna position for each of the one or more RF antennas, and the location information for the at least one feature of a structure of the UE to a global coordinate system.

21. The device of claim 15, generating a ranging measurement using the signals received from the different UE, and further comprising transmitting the ranging measurement.

22. A non-transitory computer-readable medium storing computer executable code for developing and reporting enhanced user equipment (UE) location information, the code executable by a processor to:

obtain a global positioning system (GPS) location for a user equipment (UE) using a GPS antenna at a GPS antenna position relative to a local reference frame of the UE;

receive signals from a different user equipment (UE) using one or more radio frequency (RF) antennas, each of the one or more RF antennas at an associated RF antenna position relative to the local reference frame of the UE; and;

transmit information indicative of the GPS location for the user equipment, the GPS antenna position, the RF antenna position for the one or more RF antennas and location information for at least one feature of a structure of the UE, wherein the local reference frame of the UE is defined with respect to the structure of the UE.

23. The non-transitory computer-readable medium of claim 22, wherein the UE is a vehicle, wherein the reference frame is defined with respect to at least a length and width of the vehicle, and wherein the at least one feature of the structure is at least one feature selected from the group consisting of a corner and an edge of the vehicle.

24. The non-transitory computer-readable medium of claim 22, wherein the UE is a vehicle, wherein the one or more RF antennas are a plurality of antennas, and wherein the code is executable by a processor to receive the signals from the different user equipment comprises code to receive the signals at more than one of the plurality of RF antennas.

25. The non-transitory computer-readable medium of claim 22, wherein the code is executable by a processor to:
determine information indicative of a range between the UE and the different UE.

26. The non-transitory computer-readable medium of claim 22, wherein the code is executable by a processor to:
generate a single communication message including the GPS antenna position, RF antenna position for the one or more RF antennas, and the location information for the at least one feature of the structure of the UE.

27. The non-transitory computer-readable medium of claim 22, wherein the code is executable by a processor to:
map the GPS antenna position, the RF antenna position for each of the one or more RF antennas, and the location information for the at least one feature of a structure of the UE to a global coordinate system.

28. The non-transitory computer-readable medium of claim 22, wherein the code is executable by a processor to:
generate a ranging measurement using the signals received from the different UE, and further comprising transmitting the ranging measurement.

* * * * *